US010922283B2

(12) United States Patent
Matters et al.

(10) Patent No.: US 10,922,283 B2
(45) Date of Patent: Feb. 16, 2021

(54) FILE SYNCHRONIZATION

(71) Applicant: RACKWARE, INC., Fremont, CA (US)

(72) Inventors: Todd Matters, Royersford, PA (US);
Aniket Kulkarni, Maharashtra (IN);
Vibhav Mulay, Maharashtra (IN);
Radu Vines, Livermore, CA (US);
Wenqing Jin, Saratoga, CA (US)

(73) Assignee: RACKWARE, INC., Fremont, CA (US)

( * ) Notice: Subject to any disclaimer, the term of this patent is extended or adjusted under 35 U.S.C. 154(b) by 64 days.

(21) Appl. No.: 16/283,714

(22) Filed: Feb. 22, 2019

(65) Prior Publication Data
US 2020/0272603 A1 Aug. 27, 2020

(51) Int. Cl.
*G06F 11/14* (2006.01)
*G06F 16/178* (2019.01)

(52) U.S. Cl.
CPC ........ *G06F 16/178* (2019.01); *G06F 11/1469* (2013.01); *G06F 2201/80* (2013.01); *G06F 2201/82* (2013.01); *G06F 2201/84* (2013.01)

(58) Field of Classification Search
CPC ............. G06F 11/1469; G06F 11/1471; G06F 2201/84; G06F 16/178; G06F 11/1446
See application file for complete search history.

(56) References Cited

U.S. PATENT DOCUMENTS

| | | | |
|---|---|---|---|
| 8,069,190 B2 | 11/2011 | McColl et al. | |
| 8,175,863 B1 | 5/2012 | Ostermeyer et al. | |
| 8,468,455 B2 | 6/2013 | Jorgensen et al. | |
| 8,505,003 B2 | 8/2013 | Bowen | |
| 8,909,767 B2 | 12/2014 | Sunkara et al. | |
| 9,619,172 B1* | 4/2017 | Natanzon | G06F 11/1469 |
| 9,678,685 B1* | 6/2017 | Coffing | G06F 3/065 |
| 10,146,631 B1* | 12/2018 | Pradeep | G06F 16/2365 |
| 2005/0147130 A1 | 7/2005 | Hurwitz et al. | |
| 2005/0193245 A1* | 9/2005 | Hayden | G06F 11/2069 714/13 |
| 2006/0155712 A1* | 7/2006 | Prahlad | G06F 11/1464 |
| 2007/0214456 A1 | 9/2007 | Casey et al. | |
| 2007/0250410 A1 | 10/2007 | Brignone et al. | |

(Continued)

FOREIGN PATENT DOCUMENTS

| | | |
|---|---|---|
| JP | 2008225546 | 9/2008 |
| JP | 2009140053 | 6/2009 |
| WO | 2010080214 | 7/2010 |

*Primary Examiner* — Yolanda L Wilson
(74) *Attorney, Agent, or Firm* — Kunzler Bean & Adamson

(57) ABSTRACT

Apparatuses, methods, systems, and program products are disclosed for file synchronization. An apparatus includes an origin tracking module that tracks data change information for each of at least one data change in an origin file stored on an origin device. The data change information includes a location of the data change in the origin file and a length of the data change. An apparatus includes a synchronization detecting module that detects a synchronization event associated with the origin file. An apparatus includes a synchronizing module that copies the data of the origin file for each of the at least one data change in the origin file at the tracked location and length to a target file stored on a target device.

18 Claims, 10 Drawing Sheets

(56) References Cited

U.S. PATENT DOCUMENTS

| | | |
|---|---|---|
| 2008/0086608 A1* | 4/2008 | Kano .................... G06F 3/0607 |
| | | 711/162 |
| 2008/0104107 A1* | 5/2008 | Schwaab ............ G06F 11/1456 |
| 2008/0155223 A1 | 6/2008 | Hiltgen et al. |
| 2008/0162600 A1* | 7/2008 | Mittal ................. G06F 11/1451 |
| 2009/0210527 A1 | 8/2009 | Kawato |
| 2009/0222461 A1 | 9/2009 | Alpern et al. |
| 2010/0110634 A1 | 5/2010 | Woodbury et al. |
| 2010/0185828 A1 | 7/2010 | Kano |
| 2010/0198972 A1 | 8/2010 | Umbehocker |
| 2010/0235654 A1 | 9/2010 | Malik et al. |
| 2011/0209064 A1 | 8/2011 | Jorgensen et al. |
| 2012/0011254 A1 | 1/2012 | Jamjoom et al. |
| 2012/0041928 A1* | 2/2012 | Kamra .................... G06F 16/27 |
| | | 707/656 |
| 2014/0201137 A1 | 7/2014 | Vibhor et al. |
| 2016/0314046 A1* | 10/2016 | Kumarasamy .......... G06F 11/00 |
| 2017/0031774 A1* | 2/2017 | Bolen ................... G06F 3/0619 |
| 2017/0293674 A1 | 10/2017 | De La Riviere et al. |
| 2017/0366455 A1 | 12/2017 | Pongracz et al. |
| 2018/0046487 A1 | 2/2018 | Matter et al. |

* cited by examiner

FILE SYNCHRONIZATION

FIELD

This invention relates to file synchronization and more particularly relates to synchronizing files by tracking file change information that corresponds to data that is changed in a file.

BACKGROUND

Files and other data can be backed-up and synchronized to other devices. Sometimes this requires completely scanning a file for differences between a file and it's corresponding synchronized file to identify the differences and copy the differences from the file to the corresponding synchronized file. Scanning the file each time the file is to be synchronized is inefficient because it wastes time and processing power.

SUMMARY

The subject matter of the present application has been developed in response to the present state of the art, and in particular, in response to the problem of, and the need to synchronize files that have not yet been fully solved by currently available techniques. Accordingly, the subject matter of the present application has been developed to synchronize files that overcomes at least some of the above-discussed shortcomings of prior art techniques.

An apparatus for synchronizing files includes an origin tracking module that tracks data change information for each of at least one data change in an origin file stored on an origin device. The data change information includes a location of the data change in the origin file and a length of the data change. The apparatus also includes a synchronization detecting module that detects a synchronization event associated with the origin file. The apparatus further includes a synchronizing module that copies the data of the origin file for each of the at least one data change in the origin file at the tracked location and length to a target file stored on a target device. The modules are embodied as one or more of hardware circuits, programmable hardware devices, and a processor executing code. The preceding subject matter of this paragraph characterizes example 1 of the present disclosure.

The apparatus includes a snapshot module that creates a snapshot of the origin file prior to tracking data changes in the origin file. A current data change tracking session is concluded in response to the snapshot being created. The preceding subject matter of this paragraph characterizes example 2 of the present disclosure, wherein example 2 also includes the subject matter according to example 1, above.

Data for each of the at least one data change in the origin file is read from a previously created snapshot on a file block basis prior to sending the data to the target device. The preceding subject matter of this paragraph characterizes example 3 of the present disclosure, wherein example 3 also includes the subject matter according to any one of examples 1 or 2, above.

The apparatus includes a target tracking module that tracks data change information for each of at least one data change in the target file stored on the target device. The data change information includes a location of the data change in the target file and a length of the data change. The preceding subject matter of this paragraph characterizes example 4 of the present disclosure, wherein example 4 also includes the subject matter according to any one of examples 1-3, above.

In response to the synchronization event, the target tracking module sends the tracked data change information for the target file on the target device to the origin device where it is merged into the tracked data change information for the origin file. The preceding subject matter of this paragraph characterizes example 5 of the present disclosure, wherein example 5 also includes the subject matter according to any one of examples 1-4, above.

The data change information for the target file is used to identify data in the origin file to send to the target device and overwrite the data changes that were made in the target file on the target device. The preceding subject matter of this paragraph characterizes example 6 of the present disclosure, wherein example 6 also includes the subject matter according to any one of examples 1-5, above.

Data change information is discarded on the origin device in response to the data change information being completely within a location and length of different data change information. The preceding subject matter of this paragraph characterizes example 7 of the present disclosure, wherein example 7 also includes the subject matter according to any one of examples 1-6, above.

The apparatus also includes a failover correcting module that detects a failure on the origin device where the origin device is a production device, tracks data changes to the target file on the target device in response to the target device becoming the production device, and in response to the origin device becoming available, synchronizes the tracked data changes to the target file on the target device to the origin file on the origin device. The preceding subject matter of this paragraph characterizes example 8 of the present disclosure, wherein example 8 also includes the subject matter according to any one of examples 1-7, above.

The synchronizing module is further configured to queue data for each of the at least one data change in the origin file and sends the data and the corresponding data change information to the target device in a single transaction. The preceding subject matter of this paragraph characterizes example 9 of the present disclosure, wherein example 9 also includes the subject matter according to any one of examples 1-8, above.

The synchronization event includes detecting a data change to the origin file, the synchronizing module copying the data for the data change to the target file in response to detecting the data change to the origin file. The preceding subject matter of this paragraph characterizes example 10 of the present disclosure, wherein example 10 also includes the subject matter according to any one of examples 1-9, above.

The synchronization event comprises a scheduled synchronization time, the synchronizing module copying data for the at least one data change to the target file in response to the scheduled synchronization time. The preceding subject matter of this paragraph characterizes example 11 of the present disclosure, wherein example 11 also includes the subject matter according to any one of examples 1-10, above.

The synchronizing module initially copies the origin file from the origin device to the target device in response to a copy of the origin file not being stored on the target device prior to tracking data changes to the origin file. The preceding subject matter of this paragraph characterizes example 12 of the present disclosure, wherein example 12 also includes the subject matter according to any one of examples 1-11, above.

The origin tracking module copies the data change information for the origin file to an intermediate device and, in response to the synchronization event, sends the data change information from the intermediate device to the target device so that each of the at least one data change in the origin file can be copied to the target file. The preceding subject matter of this paragraph characterizes example 13 of the present disclosure, wherein example 13 also includes the subject matter according to any one of examples 1-12, above.

A method for file synchronization includes tracking data change information for each of at least one data change in an origin file stored on an origin device. The data change information includes a location of the data change in the origin file and a length of the data change. The method includes detecting a synchronization event associated with the origin file. The method also includes copying the data of the origin file for each of the at least one data change in the origin file at the tracked location and length to a target file stored on a target device. The preceding subject matter of this paragraph characterizes example 14 of the present disclosure.

The method includes creating a snapshot of the origin file prior to tracking data changes in the origin file, wherein a current data change tracking session is concluded in response to the snapshot being created. The preceding subject matter of this paragraph characterizes example 15 of the present disclosure, wherein example 15 also includes the subject matter according to example 14, above.

The data for each of the at least one data change in the origin file is read from a previously created snapshot on a file block basis prior to sending the data to the target device. The preceding subject matter of this paragraph characterizes example 16 of the present disclosure, wherein example 16 also includes the subject matter according to example 14-15, above.

The method includes tracking data change information for each of at least one data change in the target file stored on the target device, the data change information comprising a location of the data change in the target file and a length of the data change. The preceding subject matter of this paragraph characterizes example 17 of the present disclosure, wherein example 17 also includes the subject matter according to example 14-16, above.

The method includes, in response to the synchronization event, sending the tracked data change information for the target file on the target device to the origin device where it is merged into the tracked data change information for the origin file. The preceding subject matter of this paragraph characterizes example 18 of the present disclosure, wherein example 18 also includes the subject matter according to example 14-17, above.

The data change information for the target file is used to identify data in the origin file to send to the target device and overwrite the data changes that were made in the target file on the target device. The preceding subject matter of this paragraph characterizes example 19 of the present disclosure, wherein example 19 also includes the subject matter according to example 14-18, above.

A system for file synchronization includes an origin device, a target device, and an intermediate device. The system also includes a tracking module at the origin device that tracks data change information for each of at least one data change in an origin file stored on an origin device. The data change information includes a location of the data change in the origin file and a length of the data change. The system also includes a synchronization detecting module at the origin device that detects a synchronization event associated with the origin file. The system further includes a synchronizing module at the intermediate device that facilitates copying the data of the origin file at the origin device for each of the at least one data change in the origin file at the tracked location and length to a target file stored on the target device. The preceding subject matter of this paragraph characterizes example 20 of the present disclosure.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
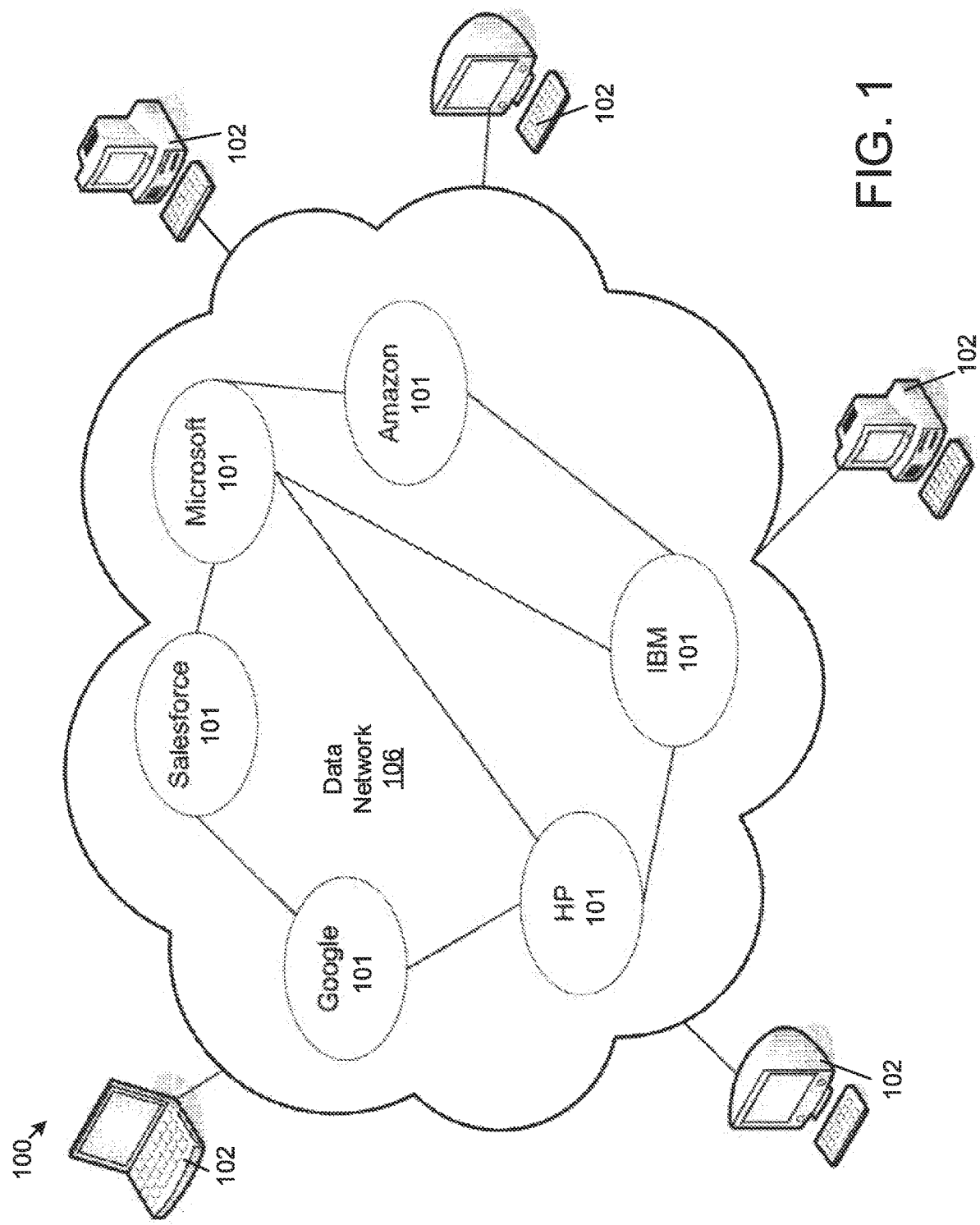
FIG. 1 is a schematic block diagram of one embodiment of a system for file synchronization.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

A hypervisor, also called virtual machine ("VM"), allows for the creation of a virtual computer or virtual system. It allows multiple operating systems on each VM to run concurrently on a host computer—a feature called hardware virtualization. Hypervisors present guest operating systems with a virtual platform and monitor the execution of the guest operating systems. In that way, multiple operating systems, including multiple instances of the same operating system, can share hardware resources. Historically, hypervisors provide the ability to consolidate many platforms with VMs. Because of this, several tools were developed to allow conversion between physical hardware resources and virtual hardware resources. However, hypervisors may experience difficulties regarding costs, network issues, disparate interfaces, and performance issues. Furthermore, many applications are not developed with hypervisors in mind. It may be difficult to plan which applications to consolidate onto a single hypervisor as application performance requirements vary over time.

In some embodiments, cloud computing is similar to the use of hypervisors, but provides an additional level of abstraction that solves many of the shortcomings of hypervisors. Cloud computing, as used herein, is Internet-based computing where shared computing hardware resources, software, and information are provided to computers and other devices on demand. Cloud computing describes a consumption and delivery model for IT services involving over-the-Internet provision of resources that provides a layer of abstraction between users and the particular computer hardware being used. Cloud computing infrastructure services deliver computer infrastructure as a service. As such, users no longer need expertise in, or control over, the technology infrastructure that supports them. Rather than purchasing servers, software, data center storage space or network equipment, users can instead purchase those resources as a fully outsourced service on an on-demand basis.

Cloud application services, referred to as "Software as a Service" (SaaS), deliver software over the Internet as a service, thus eliminating the need to install and run the application on a user's own systems. The service is typically billed on a utility computing basis based on the amount of resources consumed, where the costs generally reflect the level of activity or usage. Sharing computing resources among multiple organizations or users can improve utilization rates, since servers are not unnecessarily left idle for any extended period of time. This reduces costs significantly and can increase the speed of application development. A side-effect of this approach is that overall computer usage rises dramatically as users no longer have to engineer for peak load limits. In addition, increased high-speed bandwidth makes it possible to receive the same response times from centralized infrastructures at other sites.

Cloud computing frequently takes the form of web-based tools or applications that users can access and use through a web browser as if it were a program installed locally on their own computer. Typical cloud computing service providers deliver common business applications and storage online that are accessed from another web service or software such as a web browser while the software and data are stored remotely on the servers of the cloud computing service providers or "cloud service providers." One element of cloud computing is customization and the creation of a user-defined experience. Most cloud computing infrastructures consist of services delivered through common centers and built on servers. Clouds often appear as single points of access for all computing needs. Commercial offerings are generally expected to meet quality of service requirements, and typically include service level agreements.

FIG. 1 depicts an example diagram of a cloud computing environment 100. In the illustrated embodiment, various local user cloud client computers 102 are interconnected to one another over a data network 106 through the cloud service providers 101. Examples of cloud service providers may include Microsoft, Salesforce.com, HP, IBM, Amazon, and Google.

In one embodiment, the system 100 includes one or more information handling devices 102 or cloud client devices 102. The information handling devices 102 may include one or more of a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium. An information handling device 102, in one embodiment, may comprise computer hardware or software that utilizes cloud computing for application delivery, data storage, or the like, or that is specifically designed for delivery of cloud services.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

A "public cloud," as used herein, is defined as computing resources that are dynamically provisioned on a self-service basis over the Internet or other data network 106, via web applications or web services, from an off-site third-party cloud service provider 101 who bills its clients on a utility computing basis, much like electricity usage is billed to public utilities customers. A "private cloud," on the other hand, is a shared infrastructure that may be established within an enterprise having various departments with similar requirements. Cloud computing may require storage of massive volumes of data called "cloud storage," which is a model of networked computer data storage for storing data on multiple virtual servers, generally hosted by third parties, rather than being hosted on dedicated servers. The data center operators "virtualize" resources according to the requirements of their customers and expose them as virtual servers, which the customers can themselves can manage. Physically, the resource may span across multiple servers or storage systems.

Cloud computing, in some embodiments, allows for dynamic placement of workload on dedicated or consolidated servers based on user-defined policies. Because of increased workloads, enterprises have to do a lot of capacity planning upfront to account for peak periods of activity, while at other times, resources may go underutilized. Cloud computing provides a way to avoid this problem of requiring such upfront capacity planning by using cloud resources, which essentially pushes the capacity planning to the cloud computing service providers. From a cloud service provider point of view, having multiple enterprises with differing peak capacity requirements allows for greater capacity planning and optimization because usage among disparate customers is generally amortized over time. The average of capacity peaks over many different enterprises in many cases only requires a finite number of resources. A pay-as-you-go solution that offers compute on demand is a good complement to dedicated and consolidated infrastructure (e.g., hypervisor) in the enterprise. Enterprises currently employ any combination of physical hardware and virtual hardware (e.g., hypervisors or VMs) resources to accomplish computing tasks or workloads.

Each cloud in a cloud computing environment has finite resources; so, if a particular cloud saturates the computational and storage resources of its virtualization infrastructure, it may not be able to satisfy further requests for service allocations. By bridging and managing resources among multiple clouds, hardware computational and storage resources can be managed and optimized across any number of systems or enterprises. This may introduce new business opportunities among cloud providers, but also raises many challenges such as cloud federation, data synchronization, security, interoperability, QoS, monitoring, and billing. Users can access and use these cloud services through a web browser or other network interface as if the services were a program installed locally on their own computer.

Figure 2:
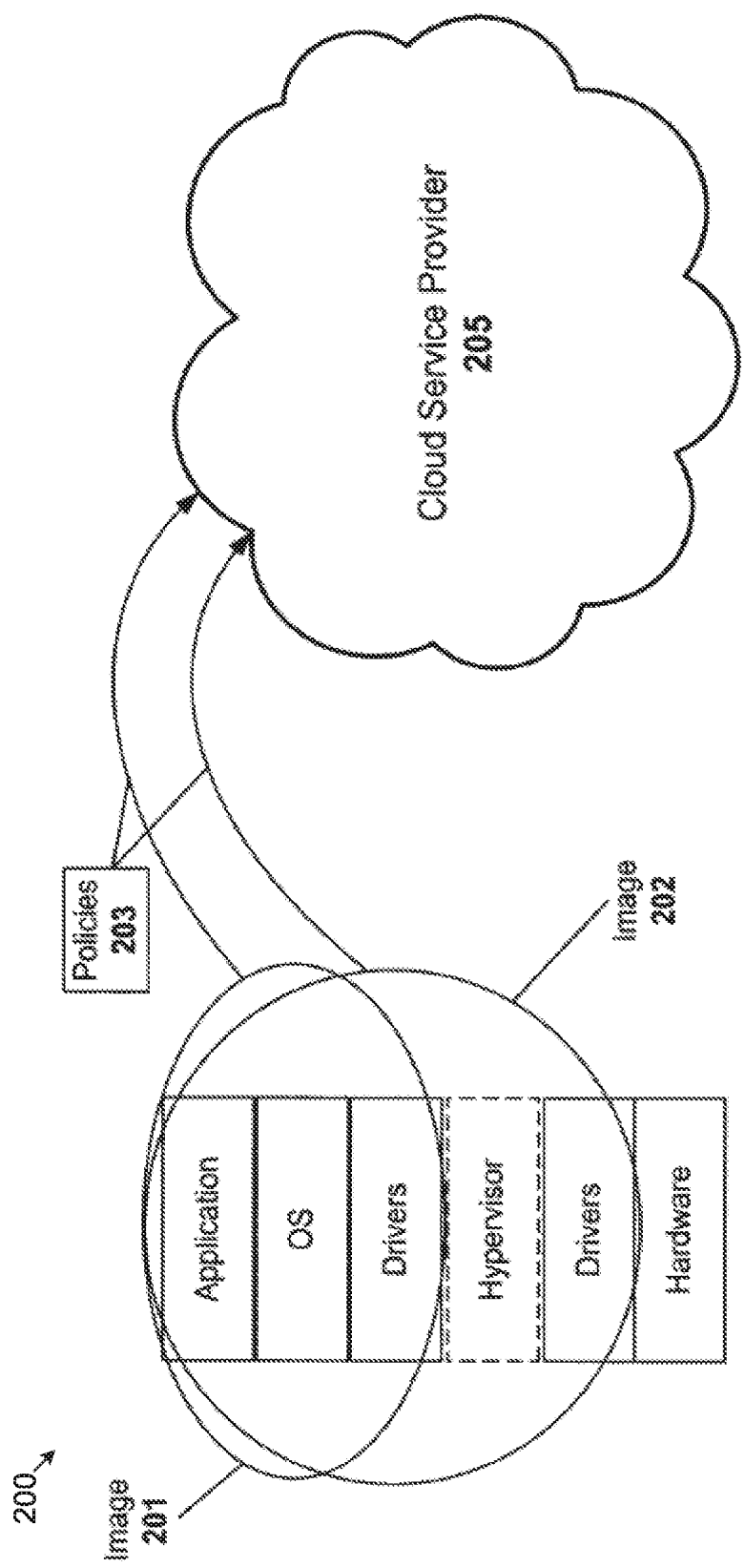
FIG. 2 is a schematic block diagram of one embodiment of another system for file synchronization.

To do this, workloads can be decoupled from the underlying hardware and placed in one or more clouds for processing. One technique by which workloads can be decoupled from the underlying system is to define a workload as an "image" (as shown in FIG. 2). An "image," as defined herein, includes an operating system ("OS"), and optionally its overlying application stack, but that has no network identity such as a virtual MAC address or an IP Address. An image may have one or more unique identifiers, e.g., an image name, a universally unique identifier ("UM"), or the like. An image may optionally include one or more network identifiers such as a virtual MAC address (e.g., in the context of an Ethernet Network), an IP address, or the like. The term "host image" can be used interchangeably with image. A host image may also have a unique identifier. A "cloud image" that has been uploaded into a cloud storage may include an operating system and optionally its overlying application stack. The storage path to the location where the image is located in the cloud may be used to identify the cloud image.

A "system," as used herein, is defined as a hardware platform (virtual or physical) capable of running an image. A system may consist of characteristics such as a processor, memory, and other peripherals. A system can be a bare metal server or a VM that exposes the same attributes as a bare metal server. As examples, a system can be identified by one of the MAC addresses of its network card, the address of its service processor, a name, a UUID, or the like. A "host," as defined herein, is any network addressable entity that is comprised of a host image running on a system, possibly within an enterprise environment. A host can be identified by an IP Address, host name, DNS host name, UUID, or the like. A "cloud host," as used herein, is a network addressable entity that is comprised of a cloud image running on a system in the cloud. The system in the cloud can be provisioned by the user at boot time. A cloud host can be identified using the path to its location in the cloud including, but not limited to, a DNS name or an IP address.

FIG. 2 depicts decoupling a workload (image) from its associated hardware system and placing it into a cloud of a particular cloud service provider. This can be accomplished by decoupling the images 201 and 202 from their underlying computing resources such that each image can be placed onto any of a multiplicity of platforms in a seamless manner, whether the platforms be other physical hardware systems (e.g. those having additional bandwidth), hypervisors, or various cloud service providers' platforms 205 as depicted in the illustrated embodiment 200. In addition, the source and destination computing resources may all be contained within an enterprise having one or more data centers within a private cloud such that data is migrated from data center to data center within the enterprise in a seamless manner. In one embodiment, an image may be configured with new capabilities such as network resources, file-system resources, and driver resources that are available to it, prior to migrating the image. The image can be configured when assigned or unassigned to a system. Metadata for the image may also be updated as part of the configuration process. Accordingly, images may be dynamically managed and provisioned based on system requirements. An image may also be embodied as a file, multiple files, a directory of files, and/or the like, such that files can be backed-up and synchronized between a local device and a cloud device.

As shown in FIG. 2, an image 201 can be defined to include an operating system and its associated application stack, as well as any associated drivers, settings (e.g., network settings, configuration settings, user settings, or the like), metadata, files, or the like stacked on top of the underlying hardware. An image 202 may also be defined to include one or more hypervisors and associated drivers. An image 201/202 can be defined and decoupled from its underlying hardware, and placed onto any other platform, including other physical systems or hypervisors, or into a public or private cloud for efficient use of processing resources. Not only can the image 201/202 be separated from the underlying hardware, but the image bits can also be separated from the metadata about the image 201/202 to enable broad image mobility functions among computing resources in a cloud computing environment.

An image 201/202 may be cloned before or after it is decoupled from its system and placed into one or more clouds, and, as described below, images on a host and in the cloud may be synchronized so that the data of each image is identical, or substantially identical. In addition, one or more policies 203 may also be uniquely defined for each image 201/202 placed in the cloud as shown in FIG. 2. These policies can be tied to various metrics that are important to the business of the customer of the cloud provider. The policies can be, for example, based on time of day, utilization rates, or the like. Images 201/202 can be migrated between physical machines, physical and virtual machines or hypervisors, physical machines and the cloud, virtual machines and the cloud, or any combination of these.

Figure 3A:
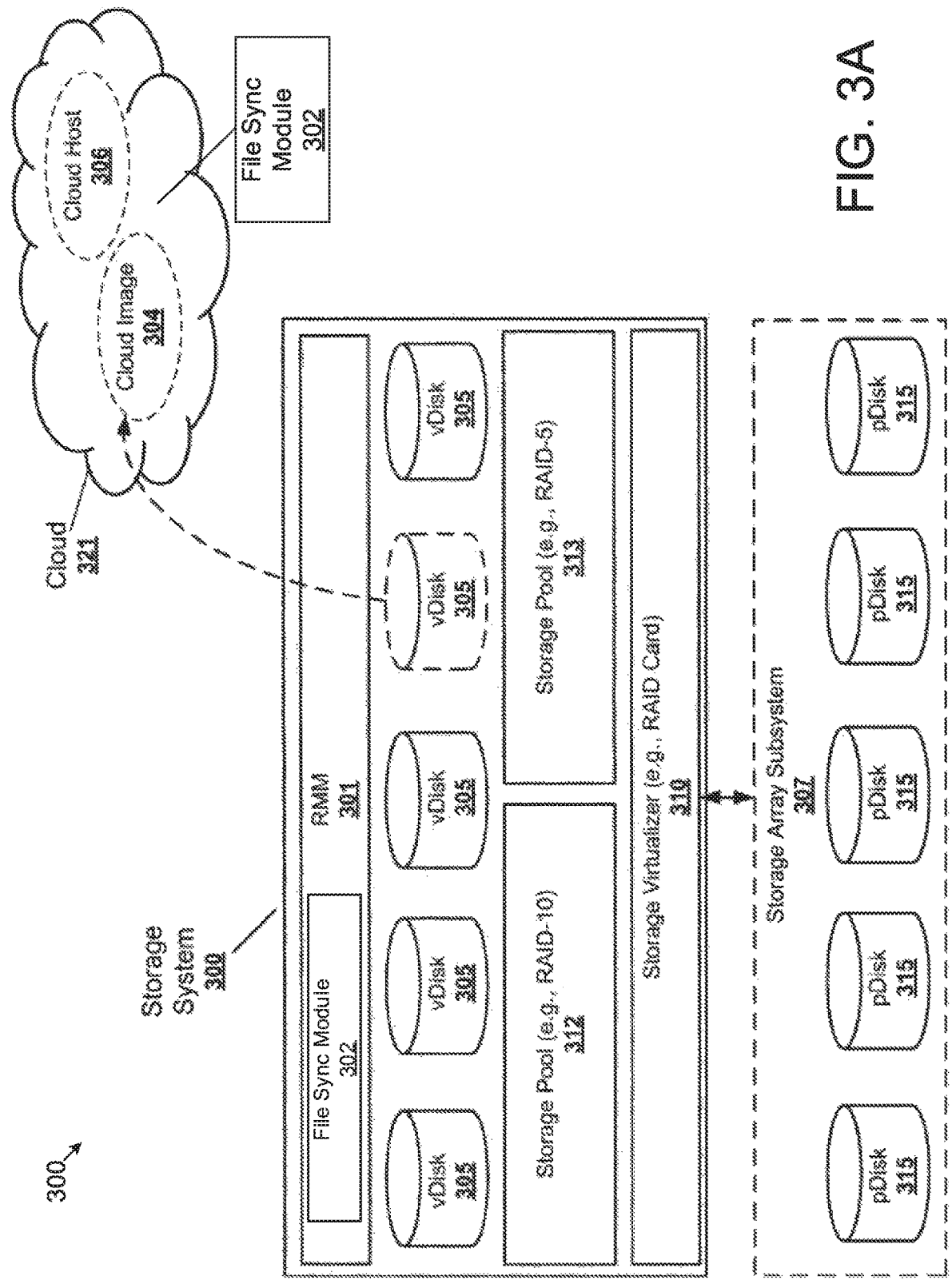
FIG. 3A is a schematic block diagram of one embodiment of yet another system for file synchronization.

FIG. 3A depicts an example embodiment of a system for file synchronization. In the illustrated embodiment, storage system 300 includes a remote management module ("RMM") 301 in communication with a number of virtual disks ("vDisks") 305 in a storage array. In one embodiment, the RMM 301 can include a Rackware Management Module having migration capabilities across physical, virtual, and cloud platforms developed by Rackware, Inc., Fremont, Calif. vDisks 305 each include a virtual disk of a certain capacity that is carved from one of storage pools 312 or 313. For example, vDisks 305 could be a 40 GB virtual disk created out of a RAID-5 storage pool 313 that has a total capacity of 400 GB. This means that the RAID-5 storage pool would have 360 GB left over which to create the other vDisks 305 in the pool. Each storage pool 312 and 313 comprises a storage virtualizer 310 in conjunction with physical disks ("pDisks") 315 that are present in the storage array subsystem 307. A storage pool 312 and 313 can have the attributes of RAID levels, as well as capacity and other access right policies that are enumerated and maintained by RMM 301. Each pDisk is a physical storage medium that is present in the storage array and can include any nonvolatile hardware storage resources such as conventional magnetic or optical disks, a SAS Drive, a SATA, flash or other solid state memory, or any combination of such devices. The RMM can group these pDisks as resources for a particular storage pool such as a RAID-10 Pool, RAID-5 pool, etc. as discussed above. A storage virtualizer 310 is typically a hardware acceleration device such as a RAID Card. The RAID Card is the main entity through which the storage pools are created out of the pDisks.

The RMM 301, in one embodiment, includes an embodiment of a file sync module 302. Similarly, one or more devices in the cloud environment 321 may include an instance of the file sync module 302. In one embodiment, the file sync module 302 is configured to synchronize changes made to a file on the host device to a target file on a target device by tracking the location and length of the file changes without storing additional copies of the data that is changed. In such an embodiment, the host device may be a local device, a device located on an organization's premises, or the like, and the target device may be a cloud device, a networked device, or the like.

Images typically do not run by themselves. Instead, they usually interact in a tiered model running as part of the enterprise workload. For example, such a workload may include: (1) a web tier; (2) an application tier; and (3) a database tier. A web tier may present web pages to the user. The user interacts with the web pages that utilize the application tier. Then, once the user is ready to make a transaction, it will get recorded in the database tier. In addition, when an image is placed in the cloud, a container may be used to bundle these tiers as needed for the task to be accomplished. A container, as used herein, is a fully described set of images (e.g., drivers, settings, applications, or the like), and optionally networking constructs required for their operation, for a host operating system, and their relationships to each other. Performance operations can be applied to the entire container or to individual elements of the container. For example, a container may be used for a particular task requiring two web tiers, three application tiers, and a database tier. These can all be combined together into a container to perform the desired functionality.

Also, a policy or group of policies can be associated with each container, just as they can be for individual images. When a container is defined, it can be placed into the cloud to perform the desired functionality, and the results can be tied back to the enterprise using a secure communications medium, such as, for example, a Virtual Private Networks ("VPNs"). Any secured communications medium can be used without departing from the principles underlying the various embodiments. Communications between customers and a particular cloud can be accomplished by message passing across one or more secure communication mediums. Additionally, a container can be split up across multiple service providers. As such, a container can span multiple clouds, which can be integrated together using one or more secure communications mediums.

In certain embodiments, the file sync module 302 is configured to track changes to one or more files located on an origin device, which may be a host or local device. Instead of tracking the data that is added or removed from the file, which requires additional storage to store copies of the data, the file sync module 302 tracks the location in the file where the change was made (e.g., an offset or other identifier that indicates the starting location in the file where data was added, removed, or both), and a length of the change (e.g., a number of bits, a number of bytes, a number of logical (e.g., at the file level) or physical blocks or portions of a block, and/or the like). When a synchronization event occurs, in one embodiment, the tracked change information is referenced to retrieve the changed data from the file (or lack of data in the event of data removal from the file) at the tracked location using the length of the change, and the changed data is sent to a target or cloud device where a corresponding target file is located so that the changed data can be inserted (or removed) from the target file at the tracked location and length such that the origin and target file are identical or "in sync". In this manner, origin and target files can be kept in sync without requiring additional storage or resources to store copies of the data that is changed, added, or removed from the origin file. The file sync module 302 is described in more detail below with reference to FIGS. 4 and 5.

Figure 3B:
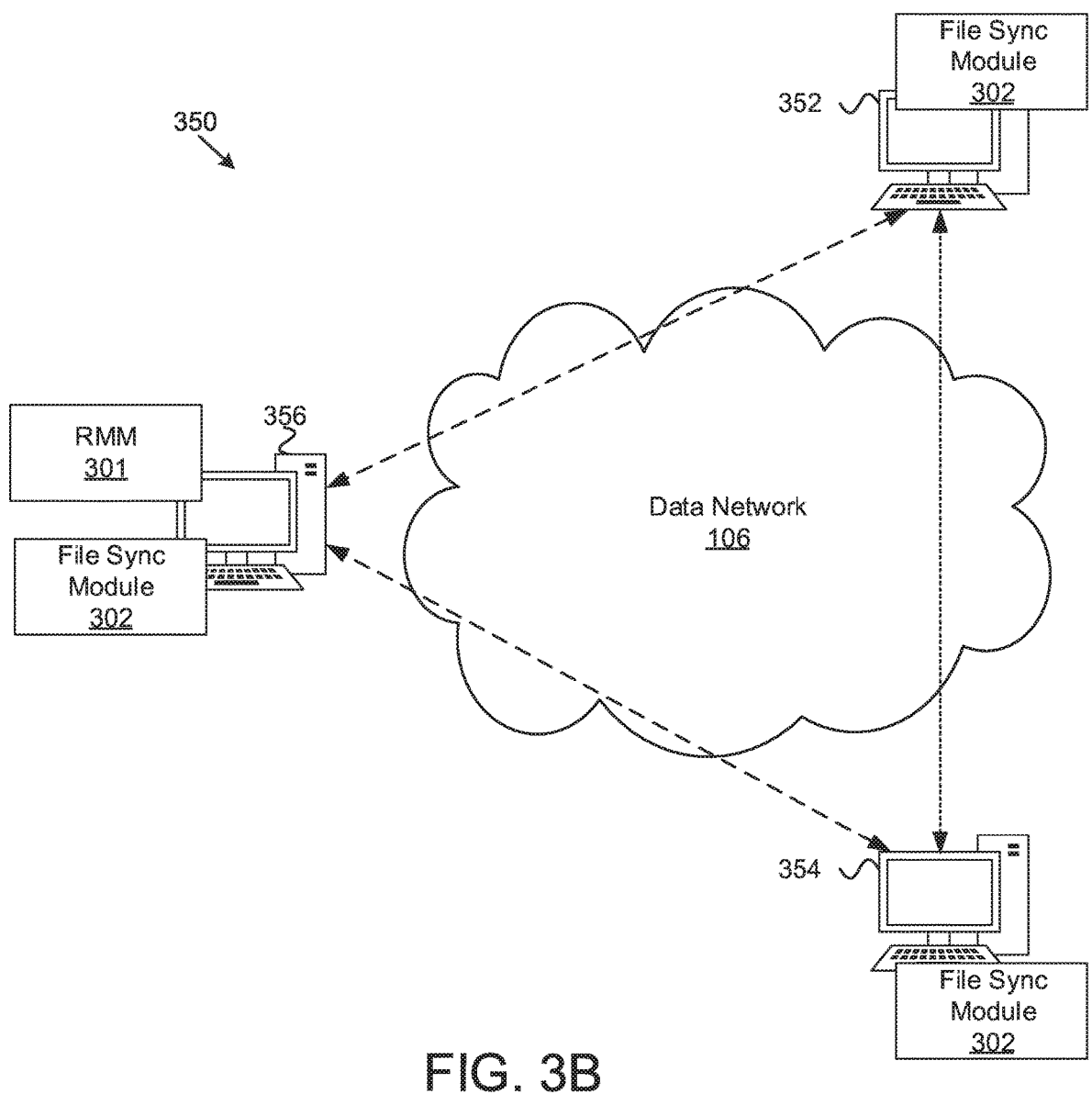
FIG. 3B is a schematic block diagram of one embodiment of a system for file synchronization.

FIG. 3B depicts another embodiment of a system 350 for file synchronization. In FIG. 3B an origin or source device 352 may be communicatively coupled to a target or storage device 354 over a data network 106. The file sync module 302 may be located at both the origin 352 and the target 354 devices. In certain embodiments, the target device 354 is a cloud device that is used to store backup or redundant copies of files, programs, applications, or the like that are used on the origin device 352. In such an embodiment, the origin device 352 is a production device, meaning that the origin device is the primary device that users use, e.g., for serving web pages, for creating and editing documents, for performing database queries, and/or the like.

In one embodiment, the file sync module 302 tracks changes to origin files on the origin device 352 by tracking the location within the files where the data changes occurred and the length of the data changes and sends the data change information including the data that is changed in the origin file on the origin device 352 to the target device 354 so that the same changes can be made in the corresponding target file on the target device 354. In this manner, the origin file 352 and the target file 354 are kept in sync with one another.

In further embodiments, the origin device 352 and the target device 354 may each be coupled to an intermediate device 356 that includes an instance of an RMM 301, as described above with reference to FIG. 3A, and a file sync module 302. In such an embodiment, the file sync module 3302 may send file change information (e.g., location and length information), snapshots, and/or the data for the file change to the intermediate device 356. The RMM 301 and/or the file sync module 302 on the intermediate device 356 may queue the file change information and data on the intermediate device 356. Multiple file changes may be queued at the intermediate device 356 and then sent to the target device 354 in a single transaction, in multiple transactions, or the like in response to a synchronization event, described below.

Figure 4:
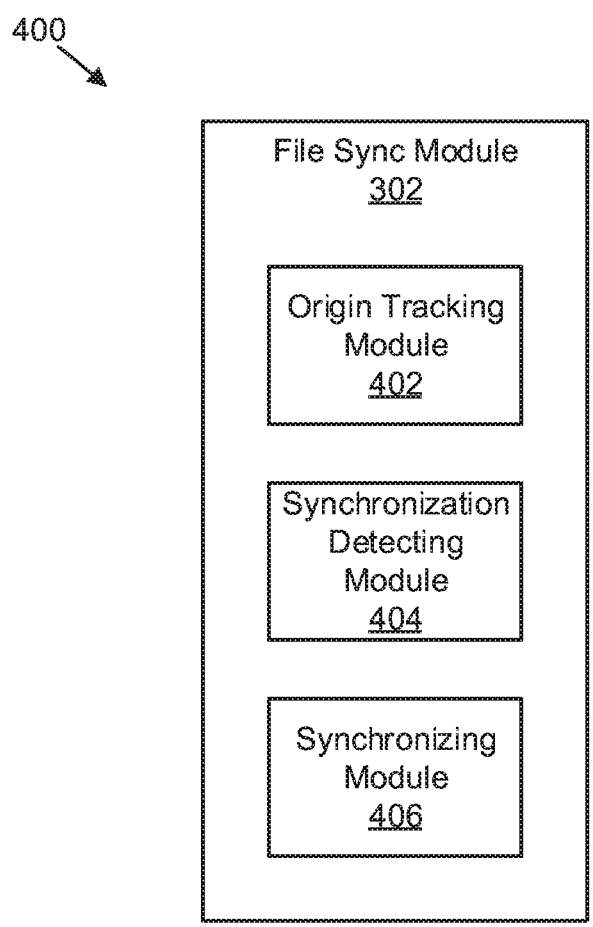
FIG. 4 is a schematic block diagram of one embodiment of a module for file synchronization.

FIG. 4 depicts one embodiment of a module 400 for file synchronization. In one embodiment, the module 400 includes an instance of a file sync module 302. The file sync module 302, in a further embodiment, includes one or more of an origin tracking module 402, a synchronization detecting module 404, and a synchronizing module 406, which are described in more detail below.

The origin tracking module 402, in one embodiment, is configured to track data change information for each of at least one data change in an origin file stored on an origin device 352. A data change, as used herein, may include adding data to a file, removing data from a file, changing data in the file, changing metadata associated with the file, and/or the like. For example, if a user is editing a document on the origin device, the origin tracking module 402 may track any and every addition, change, and/or deletion of data in the document that the user makes. Furthermore, as used herein, a file may be a computer resource for recording data discretely in a computer storage device. Files may be different types and have different purposes. For instance, a file may be designed to store text, a picture, a video, a computer program, or a wide variety of other kinds of data. Some types of files can store several types of information at once. A file may refer to a logical data structure, a logical volume or storage element, and/or the like.

In one embodiment, the data change information includes a location of the data change in the origin file, a length of the data change, and/or a value indicating whether the data change was an addition of data or a deletion of data. The location may comprise value representing an offset within the file, an absolute location in the file, a relative location in the file, and/or the like. In certain embodiments, the location may be a file location such as a file block, a data block, a page, an offset in the file, and/or the like (instead of or in addition to a location that refers to data at the storage device level). In such an embodiment, changed data may be read from the origin file at an application level and in the user space of the operating system. In some embodiments, the location may be a location on disk such as a block number, a block offset, a sector identifier, and/or the like. The length of the data change may include a number of bytes, bits, characters, cells, rows, columns, and/or the like. For instance, if a user adds characters to a document, the origin tracking module 402 may determine the location in the document where the first character was entered and the number of characters that were entered in the document from the location where the first character was added. If a user deletes characters to the document, the origin tracking module 402 may determine the location in the document where the first character was deleted and the number of characters that were deleted from the location where the first character was deleted.

In one embodiment, the origin tracking module 402 monitors files for changes. For example, the origin tracking module 402 may monitor files that have been designated or flagged to be synchronized or backed-up to the target device 354. The origin tracking module 402 may, in certain embodiments, monitor directories or other logical groupings of files. The origin tracking module 402, in one embodiment, registers for file change events with an operating system, an application (e.g., a file manager), or the like to receive notifications, signals, messages, or the like that indicate that a file has been changed. In response to receiving an indication that a file has changed, the origin tracking module 402 may track the location of the file change and the length of the file change. In certain embodiments, the origin tracking module 402 stores the file change information as metadata associated with the file, in a separate log or file, in a database or other data structure, and/or the like.

The synchronization detecting module 404, in one embodiment, is configured to detect a synchronization event associated with the origin file. As used herein, a synchronization event may include an event, trigger, signal, or the like that indicates that an origin file is out of sync with a corresponding target file and that a synchronization action needs to occur to place the origin and target files in sync. In one embodiment, the synchronization event may be the detection of a change to the origin file. For example, the synchronization detecting module 404 may detect a user editing a document as a synchronization event such that when the user is done editing the document (e.g., when the user moves to a different location in the document to edit the document, when the document is saved, or the like), then the document can be synced to the target device 354.

In another embodiment, the synchronization event may be the detection of the origin file being saved. For instance, the synchronization detecting module 404 may receive an event, notification, signal, or the like that indicates that an origin file has been saved. In further embodiments, the synchronization event may be a scheduled synchronization time. For instance, the synchronization detecting module 404 may detect that a predefined synchronization schedule has arrived (e.g., a predefined day and time for synchronizing the origin file).

In response to the synchronization event, the synchronizing module 406, in one embodiment, is configured to copy the data of the origin file for each data change in the origin file at the tracked location and length to a target file that is stored on the target device 354. In the case of a data addition, the synchronizing module 406 copies the data from the origin file at the data change location and length and sends the data, along with the location and length information, to the target device 354 so that the data can be added to the target file. In the case of a data deletion, the synchronizing module 406 sends the location and length information to the target device 354 so that the same data can be deleted from the target file on the target device 354.

In certain embodiments, if the synchronizing module 406 does not send any data with the data change information from the origin device 352, the synchronizing module 406 at the target device 354 assumes that the data change is a data deletion and deletes data from the target file at the indicated location and length. On the other hand, if the synchronizing module 406 sends data with the data change information from the origin device 352, the synchronizing module 406 at the target device 354 assumes that the data change is a data addition and adds the received data to the target file at the indicated location.

In this manner, an additional copy of the data that is added or deleted from the origin file does not need to be stored because it can be located in the origin file using the tracked location and length of the change. Furthermore, when a synchronization event occurs, a complete scan between the origin and target files does not need to be performed to locate the differences between the files because the origin tracking module 402 keeps track of the differences, as location and length information, as they occur within the origin file.

In one embodiment, the synchronizing module 406 discards, ignores, deletes, or the like data change information for the file on the origin device 352 in response to the data change information being completely within a location and a length of different data change information. For example, Table 1 below is an example of a set of tracked data changes for the origin file on the origin device 352. The origin tracking module 402 may track the changes as the initial changes since the file was created or since the most recent synchronization event (e.g., after a snapshot of the file is taken, as described below). The data change information in the table indicates that the data change information in Row 1 (1, 10, Addition) completely captures the data change information in Row 3 (1, 5, Addition) such that, in response to a synchronization event, when the data from the origin file is retrieved for the data change information in Row 1, the data changes associated with Row 3 will be retrieved at the same time (because the data changes for Row 3 are included in the range (the location and length) of the data changes in Row 1).

TABLE 1

|  | Location | Length | Addition or Deletion |
| --- | --- | --- | --- |
| 1. | 1 | 10 | Addition |
| 2. | 40 | 17 | Deletion |
| 3. | 1 | 5 | Addition |
| 4. | 16 | 27 | Addition |

In certain embodiments, the synchronizing module 406 scans the table, list, database, or the like of the tracked data changes for instances where data change information is encapsulated or captured within different data change information so that the same data is not unnecessarily retrieved multiple different times. In this manner, the synchronization process can be quickened, and less data is sent to the target device 354 over the data network 106.

In some embodiments, the synchronizing module 406 queues each of the data changes for the origin file prior to sending the data change information to the target device 354 so that each of the data changes can be sent in a single transaction, or in as few transactions as necessary, which helps reduce traffic on the network 106. In further embodiments, the synchronizing module 406 sends the data change information to an intermediate device 356, where it can be managed, queued, stored, and/or the like by the RMM 301 and/or an instance of the synchronizing module 406 located on the intermediate device 356 and forwarded to the target device 354.

In one embodiment, the synchronizing module 406 performs continuous sync operations such that as data changes for the origin file are written to a disk, the same data stream is sent to the target device 354. Accordingly, the synchronizing module 406 may monitor writes to the disk for one or more origin files, and when a write (e.g., a data change in the origin file) is detected, the data change information is sent to the target device 354 so that it can be used to incorporate the data of the data stream that is also sent to the target device 354. In such an embodiment, the data stream may include a marker, flag, indicator, variable, value, or the like that identifies a point in the data stream when the target file is "transaction consistent" with the origin file, meaning the point that the target file and the origin file are in sync or the same.

Figure 5:
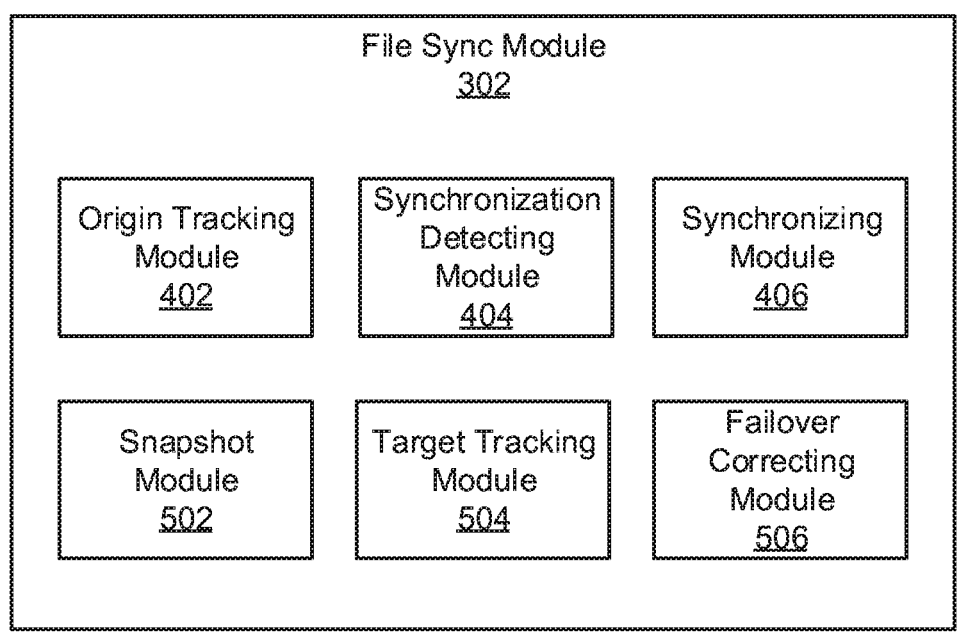
FIG. 5 is a schematic block diagram of one embodiment of another module for file synchronization.

FIG. 5 depicts one embodiment of a module 500 for file synchronization. In one embodiment, the module 500 includes an embodiment of a file sync module 302. The file sync module 302, in some embodiments, includes one or more of an origin tracking module 402, a synchronization detecting module 404, and a synchronizing module 406, which may be substantially similar to the origin tracking module 402, the synchronization detecting module 404, and the synchronizing module 406 described above. In a further embodiment, the file sync module 302 includes one or more of a snapshot module 502, a target tracking module 504, and a failover correcting module 506, which are described in more detail below.

In one embodiment, the snapshot module 502 is configured to create a snapshot of the origin file prior to tracking data changes in the origin file. As used herein, a snapshot of a file comprises an image or copy of the file that is stored in the state it was in at some point in time. The snapshot module 502, in certain embodiments, receives a trigger, signal, trigger, or the like that indicates that the origin tracking module 402 is ready to start tracking changes to the origin file. Accordingly, in response to the trigger, the snapshot module 502 creates, generates, captures, or the like a snapshot or image of the origin file.

If this is the first time that the origin tracking module 402 is tracking changes for the origin file, then the initial snapshot may be the baseline version of the origin file. In such an embodiment, the snapshot module 502 may copy the baseline version of the origin file to the target device 354 so that it corresponds to and is associated with the origin file on the origin device 352. Subsequently, the origin tracking module 402 tracks changes as they are made to the origin file. In response to the synchronization detecting module 404 detecting a synchronization event, the snapshot module 502 generates or creates a new snapshot of the origin file while the changes that were made to the origin file are sent to the target device 354 to be incorporated into the target file.

The snapshot module 502 may generate a new snapshot of the origin file at the same time that the changes to the origin file are sent to the target device 354 (e.g., in a separate thread, or the like), prior to sending the changes to the target device 354, or subsequent to sending the changes to the target device 354. In one embodiment, the snapshot module 502 queues changes to the origin file, prevents changes to the origin file, quiesces changes to the origin file, or the like until a snapshot of the origin file is generated. In this manner, the origin tracking module 402 can conclude a current tracking session so that changes to the origin file can be captured and synced to the target file in response to the synchronization event and the origin tracking module 402 can begin a new tracking session for the origin file based on the new snapshot for the origin file.

In one embodiment, the synchronizing module 406 reads data associated with each file change that the origin tracking module 402 tracks from a previously created snapshot. In such an embodiment, the synchronizing module 406 may read the data on a per-block basis (e.g., a file block or block of data from read from the file level), a per-page basis, or the like, which is sent to the target device 354 so that the changed blocks, pages, or the like can be incorporated into the target file.

In one embodiment, the target tracking module 504 is configured to track data change information for each of at least one data change in the target file stored on the target device 354. Similar to the data change information that the origin tracking module 402 tracks on the origin device, the target tracking module 504 tracks file change location information, the length of the change, whether the change is an addition or a deletion, and/or the like for the target file.

In certain embodiments, the target file may become out of sync with the origin file, e.g., if the target file is used and edited for testing purposes, if the target file is accidentally or inadvertently edited, or the like. For instance, the target device 254 may be used as a testing device to test code, applications, web pages, data transactions, databases, and/or the like before they are put into production. The target file may be used as testing data, either purposefully or accidentally, which may put the target file out of sync with the origin file on the origin device 352.

Thus, in one embodiment, the target tracking module 504 on the target device tracks data changes to the target file like the origin tracking module 402 so that the data changes can be undone, reverted, canceled, or the like, or, in alternative embodiments, used to synchronize the origin file with the target file in the event of a failover, as described in more detail below. In such an embodiment, when the synchronization detecting module 404 detects a synchronization event, e.g., at the origin device, the synchronizing module 406 may check the target device 354 to see if it has any tracked data change information for the target file that corresponds to the origin file that is being synchronized. If it does, then the target tracking module 504 may send the data changes for the target file to the origin device 352 so that the data change information for the target file can be merged, combined, integrated, or the like with the data change information, if any, for the origin file.

The synchronizing module 406 may use the data change information for the target file to locate and identify data in the origin file that can be sent back to the target device 354 to be incorporated into the target file to overwrite or "correct" the changes that were made to the target file and caused the target file and origin file to be out of sync (from the point of the most recent snapshot of the origin file). For example, if an image file that is stored on the target device has 20 pixels changed from offset 100, the target tracking module 504 may send the date change information (e.g., offset 100, 20 pixels) to the origin device 352. The origin tracking module 402 may merge, append, or otherwise incorporate the data change information from the image file on the target device 354 into the data change information for the image file on the origin device 352 so that the synchronizing module 406 can retrieve pixel data for the 20 pixels that were changed from offset 100 from the image file on the origin device 352 and send the data to the target device 354 for overwriting the changes that were made to the image file on the target device 354.

In one embodiment, the failover correcting module 506 is configured to detect a failure on the origin device 352 (e.g., a power failure, a network failure, a hardware failure, or the like) while the origin device is an active production device. In response to the failure, the failover correcting module 506 may switch the production device to the target device 354 so that the synced files on the target device 354 that correspond to the origin files can act as the production files until the failure on the origin device 352 is corrected.

In such an embodiment, the target tracking module 504 tracks changes to the target files on the target device 354 such that when the origin device 352 become the production device again, the changes that were made to the target file on the target device 354 can be copied to the corresponding origin files on the origin device 352 such that the origin files can continue to be used in production.

In certain embodiments, the origin tracking module 402 buffers, queues, stores, collects, or the like data change information for the origin file at an intermediate device 356, as shown in FIG. 3B. For instance, when a change is made to an origin file, the origin tracking module 402 may send the data change information (e.g., the location, length, and/or type of change) to the intermediate device 356 to be stored as a primary storage location for the data changes or as a redundant or backup storage location. In this manner, the tracked data changes for the origin file can be preserved at the intermediate device 356 in the event of a failure on the origin device 352.

In certain embodiments, the origin tracking module 402 sends the data associated with a tracked data change to the intermediate device 356 along with the data change information. For instance, if the data change is an addition to the origin file, the origin tracking module 402 may send the location and length of the data change and also the data from the origin file that corresponds to the location and the length. In this manner, if there is a failure at the origin device 352 prior to a synchronization event and which prevents a synchronization event before switching production to the target device 354, the data for the data change information can be preserved so that the changes can be made to the target file on the target device 354 prior to making the target device 354 the production device.

Similarly, the target tracking module 504 may send data change information and/or data to the intermediate device 356 when data changes are made to target files that have corresponding synced origin files. At the intermediate device 356, the RMM 301 and/or the file sync module 302 may manage the reception of data change information from the origin device 352 or target device 354, manage the storage, buffering, or queuing of the data change information, and the transmission or communication of the data change information to the origin device 352 and/or the target device 354.

In certain embodiments, all of the data (e.g., files, logical volumes, or the like) are synchronized at the same time to a corresponding target device 354 using an intermediate device 356 to queue, buffer, or the like data change information and data. For example, an origin server may have two logical volumes, logical volume 1 and logical volume 2. If the first logical volume is synchronized to a target server, and then the data network 106 goes down before the second logical volume can be synchronized to the target server the data may be inconsistent when the target server is recovered back to the origin server because there may be a dependency on the two logical volumes. Thus, in some embodiments, as data is moved from the origin server for logical volume 1 it can be stored on an intermediate device 356 until logical volume 2 is also copied to the intermediate device 356. At which point, when the intermediate device 356 gets an indication that the logical volumes are completely copies to the intermediate device 356, the logical volumes will be copied to the target server from the intermediate device 356. In this manner, logical volumes 1 and 2 may be maintained in a consistent state when the target server is recovered back to the origin server.

Therefore, in one embodiment, when an intermediate device 356 is used, file changes from the origin device 352 and from the target device 354 are copied to the intermediate device 356. Thus, all of the data changes to the origin and target files for the current data change tracking session are written to the intermediate device 356. The RMM 301 and/or synchronizing module 406 may queue multiple data changes to the intermediate device 356 (e.g., across different sync iterations). Then when a synchronization event is detected, the synchronizing module 406 will commit the data changes that are queued at the intermediate device 356 to the target device 354. In certain embodiments, synchronization parameters may be configurable such as how many data changes to queue to the intermediate device 356, when to commit the data changes to the target device 354, and/or the like. In further embodiments, the origin device 352, the intermediate device 356, and/or the target device 354 may allocate a dedicated memory location for storing data changes for the origin file and/or the target file.

In this manner, changes to files, storage volumes, or the like at both the origin device 352 and the target device 354 can be tracked and merged in response to a synchronization event. The merged data changes may be stored in the dedicated memory location at the origin 352, target 354, and/or intermediate device 356 such that if the origin device 352 or the target device fails or become unavailable, the tracked data changes in the dedicated memory location can be discarded and the synchronization can revert to a legacy or previous snapshot of the origin or target file, or perform full synchronization of the origin file. In certain embodiments, writing and queuing data changes to the target device 356 is faster and also enables the synchronization to be an atomic operation.

Figure 6:
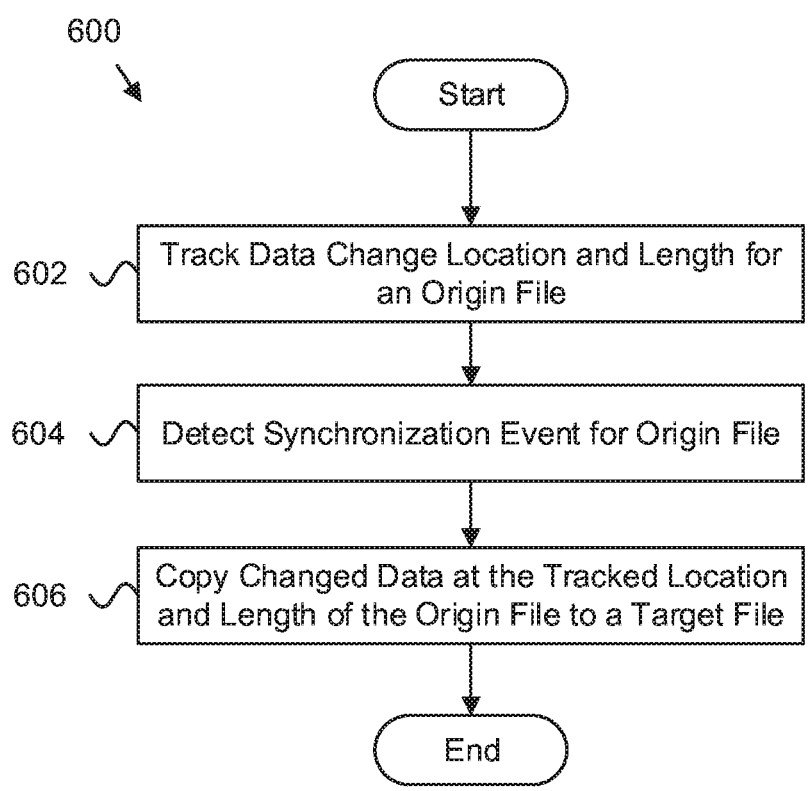
FIG. 6 is a schematic flow chart diagram of one embodiment of a method for file synchronization.

FIG. 6 is a schematic flow chart diagram illustrating one embodiment of a method 600 for file synchronization. In one embodiment, the method 600 begins and tracks 602 data change information for each of at least one data change in an origin file stored on an origin device 352. In certain embodiments, the data change information includes a location of the data change in the origin file and a length of the data change (and possible the type of data change—addition of data or deletion of data or both).

In further embodiments, the method 600 detects 604 a synchronization event associated with the origin file. In various embodiments, the method 600 copies 606 the data of the origin file for each of the at least one data change in the origin file at the tracked location and length to a target file stored on a target device 354, and the method 600 ends. In some embodiments, the origin tracking module 402, the synchronization detecting module 404, and the synchronizing module 406 perform one or more steps of the method 600.

Figure 7:
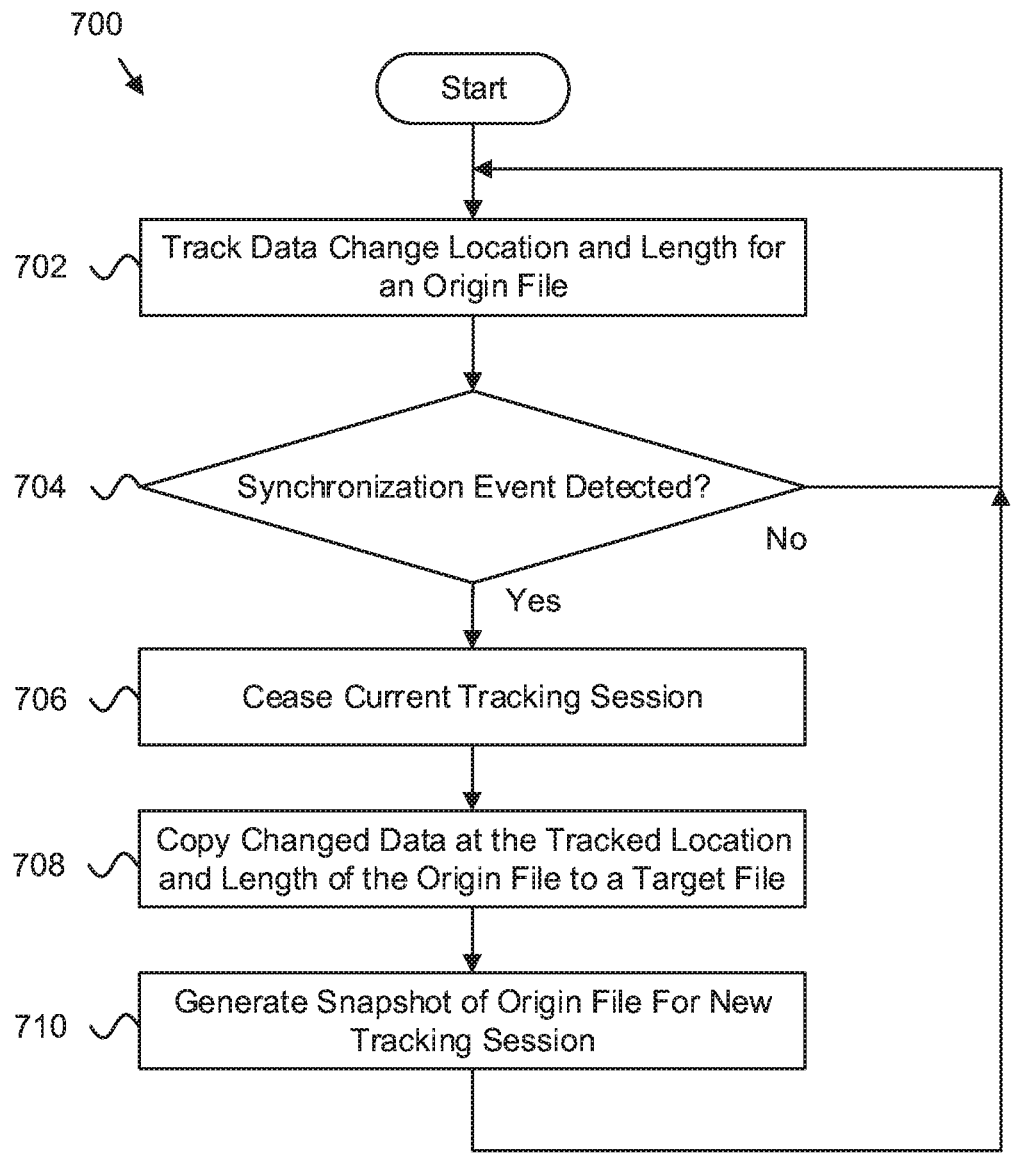
FIG. 7 is a schematic flow chart diagram of one embodiment of another method for file synchronization.

FIG. 7 is a schematic flow chart diagram illustrating one embodiment of a method 700 for file synchronization. In one embodiment, the method 700 begins and tracks 702 data change information for each of at least one data change in an origin file stored on an origin device 352. In certain embodiments, the method 700 determines 704 whether a synchronization event is detected.

In certain embodiments, if a synchronization event is not detected 704, then the method 700 continues to track 702 data changes to the origin file. In one embodiment, if a synchronization event is detected 704, the method 700 ceases 706 the current data change tracking session for the origin file. The method 700, in further embodiments, copies 708 the data of the origin file for each of the at least one data change in the origin file at the tracked location and length to a target file stored on a target device 354.

In one embodiment, the method 700 generates 710 a snapshot of the origin file for a new tracking session (e.g., to be the baseline version of the origin file for the new tracking session), and the method 700 continues to track 702 data changes to the origin file. In some embodiments, the origin tracking module 402, the synchronization detecting module 404, the synchronizing module 406, and the snapshot module 502 perform one or more steps of the method 700.

Figure 8:
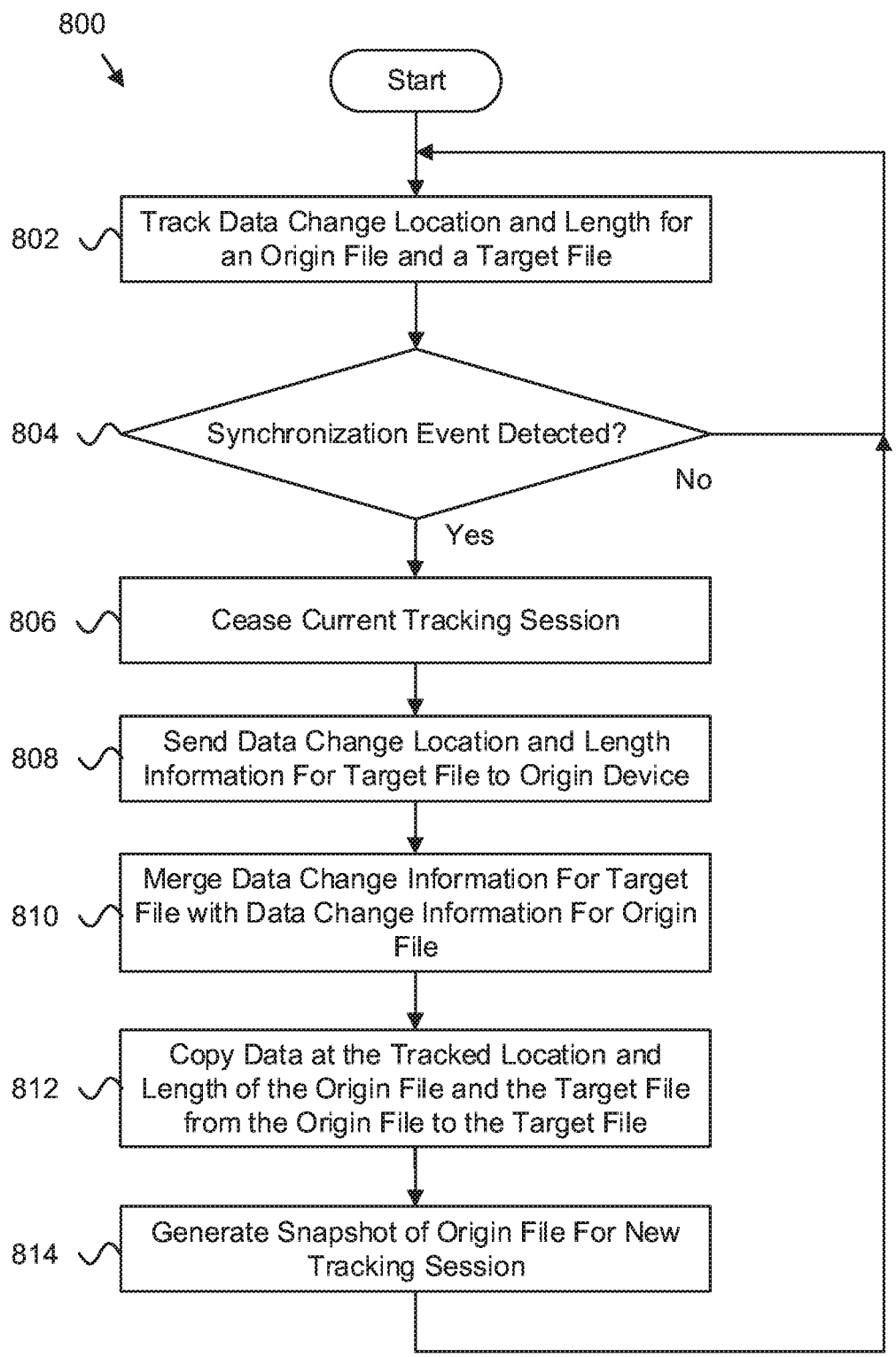
FIG. 8 is a schematic flow chart diagram of one embodiment of a method for file synchronization.

FIG. 8 is a schematic flow chart diagram illustrating one embodiment of a method 800 for file synchronization. In one embodiment, the method 800 begins and tracks 802 data change information for each of at least one data change in an origin file stored on an origin device 352. In certain embodiments, the method 800 determines 804 whether a synchronization event is detected.

In certain embodiments, if a synchronization event is not detected, then the method 800 continues to track 802 data changes to the origin file. In one embodiment, if a synchronization event is detected 804, the method 800 ceases 806 the current data change tracking session for the origin file. In further embodiments, the method 800 sends 808 data change information (e.g., file location of the data change and the length of the data change) for the target file on the target device 354 to the origin device 352.

In one embodiment, the method 800 merges 810 the data change information for the target file that is received from the target device 354 with the data change information for the origin file at the origin device 352. In certain embodiments, the method 800 copies 812 the data of the origin file for each of the at least one data change in the origin file and the target file at the tracked location and length of the origin file to a target file stored on a target device 354.

In one embodiment, the method 800 generates 814 a snapshot of the origin file for a new tracking session (e.g., to be the baseline version of the origin file for the new tracking session), and the method 800 continues to track 802 data changes to the origin file. In some embodiments, the origin tracking module 402, the synchronization detecting module 404, the synchronizing module 406, the snapshot module 502, and the target tracking module 504 perform one or more steps of the method 800.

Figure 9:
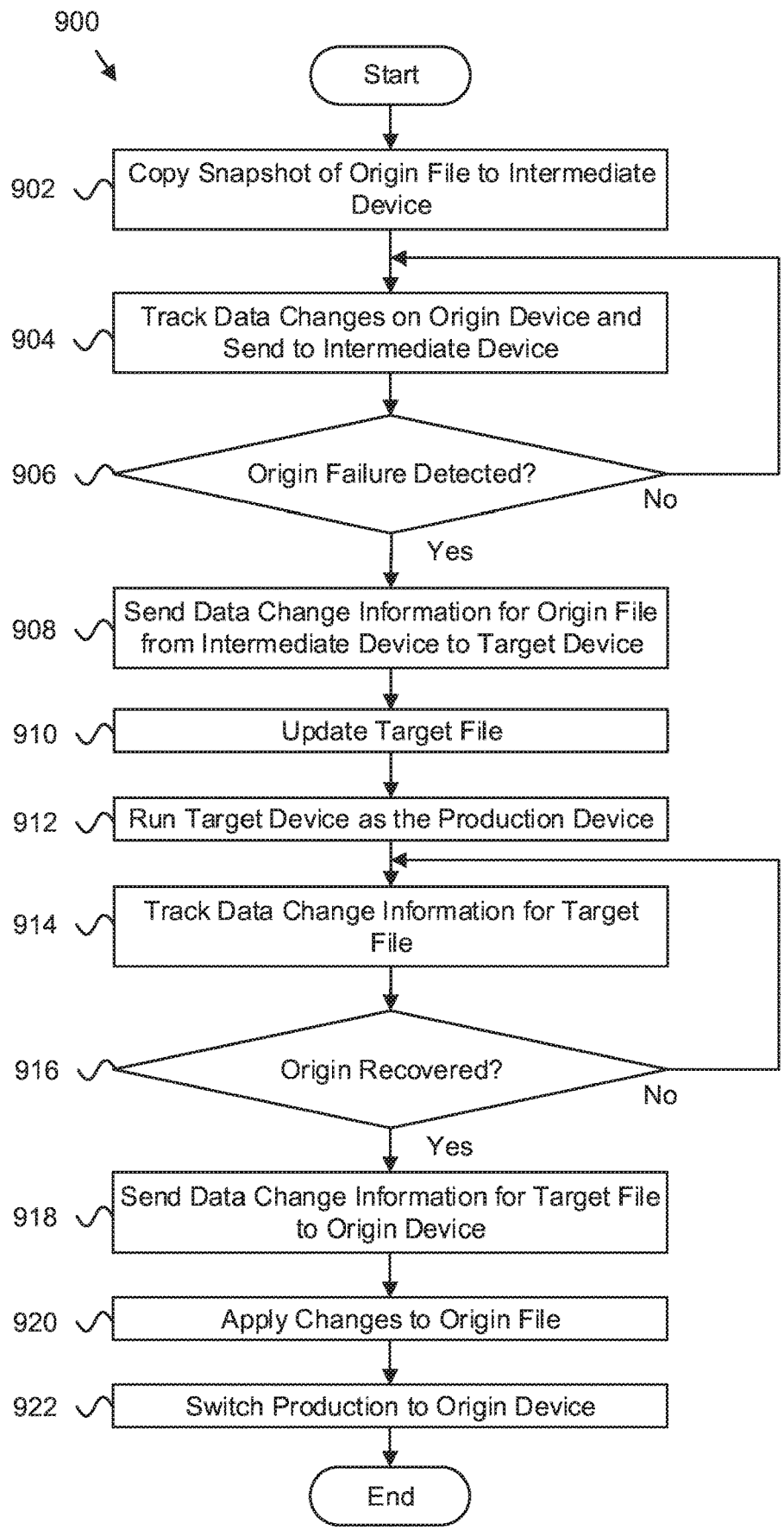
FIG. 9 is a schematic flow chart diagram of one embodiment of another method for file synchronization.

FIG. 9 is a schematic flow chart diagram illustrating one embodiment of a method 900 for file synchronization. In one embodiment, the method 900 copies 902 a snapshot for the origin file to an intermediate device 356, e.g., in response to the snapshot being created at the origin device 352. In some embodiments, the method 900 tracks 904 data change information for the origin file on the origin device 352 and sends the data change information to an intermediate device 356.

In certain embodiments, the method 900 determines 906 whether a failure event has occurred on the origin device 352. If not, the method 900 continues to track 904 data change information for the origin file on the origin device 352. Otherwise, the method 900 sends 908 data change information for the origin file to the target device 354 from the intermediate device 356. For example, the method 900 may use the snapshot of the origin file on the intermediate device 356 to send data for the data changes for the origin file to the target device 354 to be incorporated in the target file.

In one embodiment, the method 900 updates 910 the target file with the data change information for the origin file such that the target and origin files are in sync. The method 900, in certain embodiments, runs 912 the target device as the production device. The method 900, in further embodiments, tracks 914 data change information for the target file while the target file is used in production. In certain embodiments, the method 900 determines 916 whether the origin device 352 has recovered from the failure. If not, the method 900 continues to track 914 data change information for the target file.

Otherwise, the method 900, in one embodiment, sends 918 data change information for the target file to the origin device 352, where the method 900 applies 920 the file changes to the origin file so that the target and origin files are in sync. The method 900 switches 922 production back to the origin device 352, and the method 900 ends. In some embodiments, the origin tracking module 402, the synchronization detecting module 404, the synchronizing module 406, the snapshot module 502, the target tracking module 504, and the failover correcting module 506 perform one or more steps of the method 900.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an origin tracking module that tracks data change information for each of at least one data change in an origin file stored on an origin device, the data change information comprising a location of the data change in the origin file and a length of the data change;
   a synchronization detecting module that detects a synchronization event associated with the origin file;
   a synchronizing module that copies the data of the origin file for each of the at least one data change in the origin file at the tracked location and length to a target file stored on a target device; and
   a snapshot module that creates a snapshot of the origin file prior to tracking data changes in the origin file, wherein a current data change tracking session is concluded in response to the snapshot being created,
   wherein said modules comprise one or more of hardware circuits, programmable hardware devices, and a processor executing code.

2. The apparatus of claim 1, wherein the data for each of the at least one data change in the origin file is read from a previously created snapshot on a file block basis prior to sending the data to the target device.

3. The apparatus of claim 1, wherein the synchronizing module is further configured to queue data for each of the at least one data change in the origin file and sends the data and the corresponding data change information to the target device in a single transaction.

4. The apparatus of claim 1, wherein the synchronization event comprises detecting a data change to the origin file, the synchronizing module copying the data for the data change to the target file in response to detecting the data change to the origin file.

5. The apparatus of claim 1, wherein the synchronization event comprises a scheduled synchronization time, the synchronizing module copying data for the at least one data change to the target file in response to the scheduled synchronization time.

6. The apparatus of claim 1, wherein the synchronizing module initially copies the origin file from the origin device to the target device in response to a copy of the origin file not being stored on the target device prior to tracking data changes to the origin file.

7. The apparatus of claim 1, wherein the origin tracking module copies the data change information for the origin file to an intermediate device and, in response to the synchronization event, sends the data change information from the intermediate device to the target device so that each of the at least one data change in the origin file can be copied to the target file.

8. An apparatus comprising:
   an origin tracking module that tracks data change information for each of at least one data change in an origin file stored on an origin device, the data change information comprising a location of the data change in the origin file and a length of the data change;
   a synchronization detecting module that detects a synchronization event associated with the origin file;
   a synchronizing module that copies the data of the origin file for each of the at least one data change in the origin file at the tracked location and length to a target file stored on a target device; and
   a target tracking module that tracks data change information for each of at least one data change in the target file stored on the target device, the data change information comprising a location of the data change in the target file and a length of the data change,
   wherein said modules comprise one or more of hardware circuits, programmable hardware devices, and a processor executing code.

9. The apparatus of claim 8, wherein, in response to the synchronization event, the target tracking module sends the tracked data change information for the target file on the target device to the origin device where it is merged into the tracked data change information for the origin file.

10. The apparatus of claim 9, wherein the data change information for the target file is used to identify data in the origin file to send to the target device and overwrite the data changes that were made in the target file on the target device.

11. An apparatus comprising:
an origin tracking module that tracks data change information for each of at least one data change in an origin file stored on an origin device, the data change information comprising a location of the data change in the origin file and a length of the data change;
a synchronization detecting module that detects a synchronization event associated with the origin file;
a synchronizing module that copies the data of the origin file for each of the at least one data change in the origin file at the tracked location and length to a target file stored on a target device, and
wherein data change information is discarded on the origin device in response to the data change information being completely within a location and length of different data change information, and
wherein said modules comprise one or more of hardware circuits, programmable hardware devices, and a processor executing code.

12. An apparatus comprising:
an origin tracking module that tracks data change information for each of at least one data change in an origin file stored on an origin device, the data change information comprising a location of the data change in the origin file and a length of the data change;
a synchronization detecting module that detects a synchronization event associated with the origin file;
a synchronizing module that copies the data of the origin file for each of the at least one data change in the origin file at the tracked location and length to a target file stored on a target device; and
a failover correcting module that:
detects a failure on the origin device, the origin device being a production device;
tracks data changes to the target file on the target device in response to the target device becoming the production device; and
in response to the origin device becoming available, synchronizes the tracked data changes to the target file on the target device to the origin file on the origin device,
wherein said modules comprise one or more of hardware circuits, programmable hardware devices, and a processor executing code.

13. A method comprising:
tracking data change information for each of at least one data change in an origin file stored on an origin device, the data change information comprising a location of the data change in the origin file and a length of the data change;
detecting a synchronization event associated with the origin file;
copying the data of the origin file for each of the at least one data change in the origin file at the tracked location and length to a target file stored on a target device; and
creating a snapshot of the origin file prior to tracking data changes in the origin file, wherein a current data change tracking session is concluded in response to the snapshot being created.

14. The method of claim 13, wherein the data for each of the at least one data change in the origin file is read from a previously created snapshot on a file block basis prior to sending the data to the target device.

15. A method comprising:
tracking data change information for each of at least one data change in an origin file stored on an origin device, the data change information comprising a location of the data change in the origin file and a length of the data change;
detecting a synchronization event associated with the origin file;
copying the data of the origin file for each of the at least one data change in the origin file at the tracked location and length to a target file stored on a target device; and
tracking data change information for each of at least one data change in the target file stored on the target device, the data change information comprising a location of the data change in the target file and a length of the data change.

16. The method of claim 15, further comprising, in response to the synchronization event, sending the tracked data change information for the target file on the target device to the origin device where it is merged into the tracked data change information for the origin file.

17. The method of claim 16, wherein the data change information for the target file is used to identify data in the origin file to send to the target device and overwrite the data changes that were made in the target file on the target device.

18. A system comprising:
an origin device;
a target device;
an intermediate device communicatively coupled to the origin device and the target device over a data network;
a tracking module at the origin device that tracks data change information for each of at least one data change in an origin file stored on an origin device, the data change information comprising a location of the data change in the origin file and a length of the data change;
a synchronization detecting module at the origin device that detects a synchronization event associated with the origin file;
a synchronizing module at the intermediate device that facilitates copying the data of the origin file at the origin device for each of the at least one data change in the origin file at the tracked location and length to a target file stored on the target device; and
a snapshot module that creates a snapshot of the origin file prior to tracking data changes in the origin file, wherein a current data change tracking session is concluded in response to the snapshot being created.

* * * * *